Patented June 21, 1927.

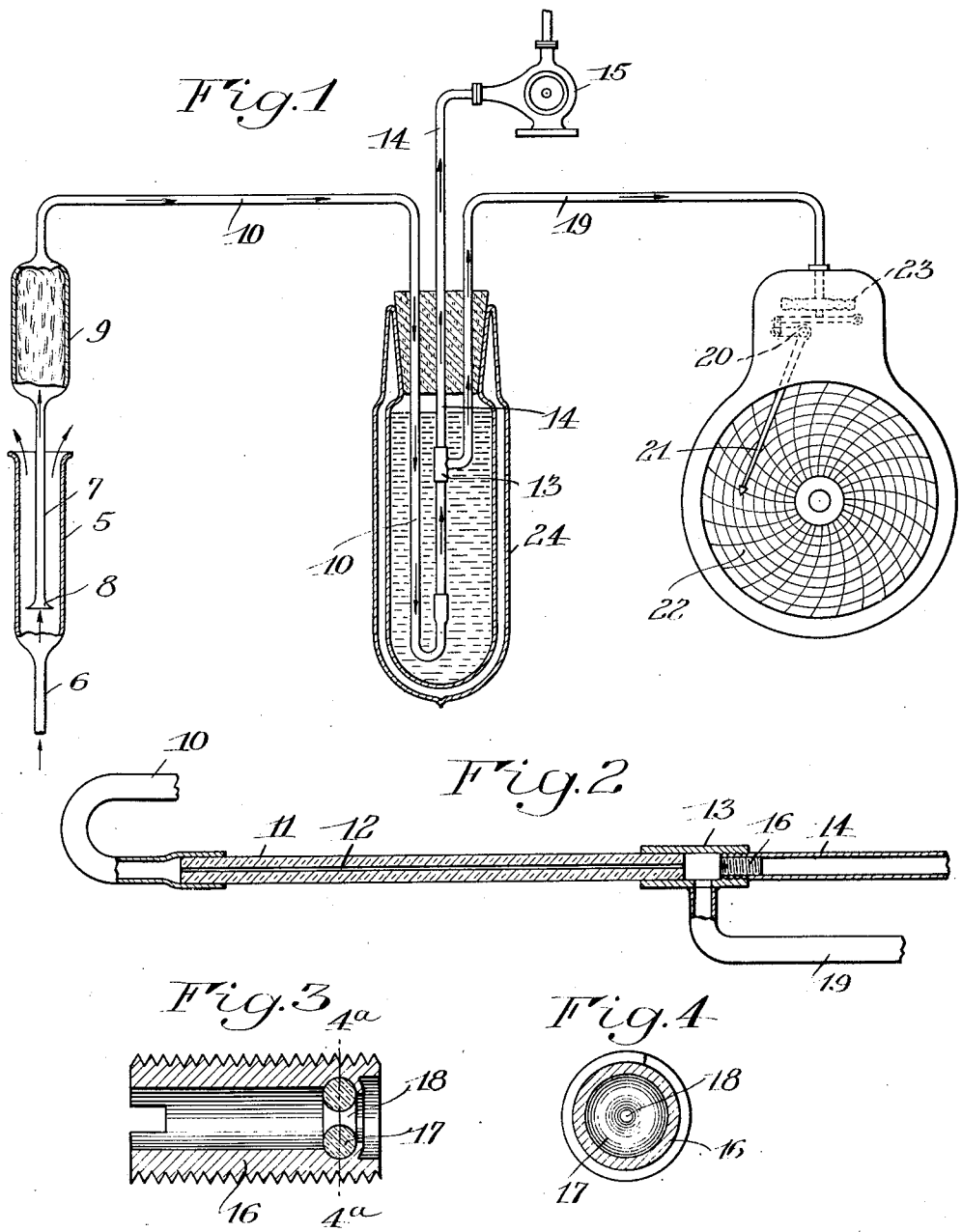

1,633,352

UNITED STATES PATENT OFFICE.

KENNETH L. TATE, OF ROCHESTER, NEW YORK, ASSIGNOR TO TAYLOR INSTRUMENT COMPANIES, OF ROCHESTER, NEW YORK, A CORPORATION OF NEW YORK.

GAS-ANALYSIS APPARATUS.

Application filed February 23, 1926. Serial No. 90,021.

This invention relates to gas analysis apparatus of the variety adapted, for example, for measuring the quantity of one or more of the component gases present in a gaseous mixture. One object of the invention is to provide a more practical, accurate and reliable apparatus of this character capable of operating in a continuous manner in response to variations in the quantity of a component gas in a current of said mixture. Another object is the provision of a simple and efficient apparatus of the above character capable of affording accurate and reliable results substantially independent of close regulation of operating pressures, temperatures and other operating conditions. Another object is the provision of such an apparatus utilizing the principles of transpiratory flow of gases for analytical purposes. A further object is the provision of an apparatus of this nature in which advantage is taken of the principle of maximum flow of gas through an orifice for maintaining the application of a substantially constant pressure ratio to a transpiratory passage for eliminating the effects of fluctuations in the operating pressures. Still a further object is the provision of such an apparatus particularly adapted for application to flue gas analysis for determining the quantity of $CO_2$ present in a sample of flue gas.

To these and other ends the invention resides in certain improvements and combinations of parts, all as will be hereinafter more fully described, the novel features being pointed out in the claims at the end of the specification.

In the drawings:—

Figure 1 is a diagrammatic view, partly in section, of an apparatus embodying the present invention;

Figure 2 is an enlarged sectional view of a sensitive chamber provided with a capillary inlet and restricted outlet in accordance with the present invention;

Figure 3 is an enlarged sectional view of the chamber outlet orifice and the mounting for the same; and Figure 4 is a sectional view substantially on the line $4^a$—$4^a$ in Figure 3.

Similar reference numerals throughout the several views indicate the same parts.

The invention is embodied in the present instance, by way of illustration, in an apparatus particularly adapted for the purpose of measuring, indicating and recording the proportions of carbon dioxide in flue gas, comprising a reservoir 5 open at its top to atmospheric pressure. Clean dry flue gas is fed into the sampling reservoir 5 through a pipe 6 by any suitable means and is preferably purified in the usual or any suitable manner as with a filter, calcium chloride dryer, etc., as well understood in the art. The gas in reservoir 5 under atmospheric pressure overflows at its top as indicated by the arrows, while a small portion is drawn into a tube 7 having a flared lower end 8 depending into the reservoir as shown. Tube 7 communicates with a filter 9 containing cotton or other suitable material and thence with the sensitive element of the apparatus through the pipe 10, as shown, to afford a continuous sample of clean dry flue gas at atmospheric pressure.

The sensitive element of the apparatus utilizes the principle of the varying viscosities of different gases in their effects upon the transpiratory flow of the same through a capillary passage. For this purpose, the flow of the gas through the passage is induced by a difference in the pressures on the ends of the passage which pressure difference is maintained substantially constant independent of fluctuations in the pressures produced by the primary operating means such as a pump or exhauster. It has been found that use may be advantageously made for this purpose of the additional principle of the "maximum flow" of gas through an orifice. The latter principle involves the phenomenon of the substantially constant rate of flow of a gas through a suitable orifice when the pressure on one side of the orifice is maintained less than substantially one-half the pressure applied to the other side of the orifice. Utilizing these two principles of gaseous flow, a suitable chamber is provided with a capillary transpiration inlet and an effusion orifice outlet such as described, so that by suitably designing the passages and maintaining a certain minimum external pressure on the outlet relative to a suitable inlet pressure such, for example, as that of the atmosphere, the pressure of the chamber may be readily maintained constant independent of fluctuations in the external outlet pressure, except, of course, for barometric fluctuations which are otherwise compensated for as hereafter described.

The capillary inlet is formed in the present instance by a tube 11 of porcelain or other suitable material having a capillary bore 12, as shown, to which the gaseous mixture is supplied through the said pipe 10 fitted to the end of tube 11, as shown. Capillary tube 11 may have various dimensions in different applications, the essential consideration being the provision of the elongated capillary bore 12 capable of producing transpiratory flow of gas. Tube 11 is fitted at its other end to one end of a chamber 13 formed in the present instance by a fitting, as shown, the opposite end of which communicates with a pipe 14 leading to a means for producing a reduced pressure as, for example, the small pump or blower 15.

The effusion orifice outlet of the chamber in the present instance is located in the communicating end of pipe 14 into which is screw-threaded the detachable orifice mounting or tube 16, best shown in Figures 3 and 4. Mounted in this tube is a member having a suitable orifice capable of producing effusion flow of the gas. Such an orifice is formed in the present instance by a ring 17 having a suitable orifice 18 therethrough of the form shown. A center jewel such as employed in high grade watches serves admirably for such ring 17. The sample of gas is thus drawn continuously through the capillary bore 12, chamber 13, orifice 18 and pipe 14 by the exhauster 15 with the effects hereinafter more particularly described.

For the purpose of measuring the pressures in chamber 13, the latter is provided with a laterally communicating pipe 19 leading in the present instance to a sensitive pressure recording instrument 20 of any suitable variety known in the art having a pen arm 21 moved over a clock driven chart 22 by pressure responsive means such as a suitable form of linkage bearing on a capsular diaphragm 23 for simultaneously indicating and recording the pressure in chamber 13.

As the gaseous mixture issuing from sampling reservoir 5 becomes richer in $CO_2$, the absolute pressure in chamber 13 increases in a definite relation to the percentage of $CO_2$ contained in the flue gas. This pressure which is thus indicative only of the $CO_2$ content, is registered by the recording pressure gauge 20 in terms of percent carbon dioxide. The gaseous mixture or flue gas enters pipe 10 under atmospheric pressure, say 14.7 pounds per square inch absolute, and from this pipe the mixture is drawn into the chamber inlet passage or capillary 12 and through the latter into chamber 13 with a considerable loss in pressure head due to viscosity effects. From chamber 13 the mixture flows through the chamber outlet or orifice 18 into the exhauster pipe 14 in which the pressure is, say 2 pounds per square inch absolute. As an illustration of the response of pressure in chamber 13 to the quantity of $CO_2$ in the mixture, a capillary and orifice of suitable proportions have been found to afford a pressure of 5 pounds per square inch absolute in the chamber for flue gas containing no $CO_2$, and 5.20 pounds per square inch absolute for flue gas containing 20% $CO_2$.

The outlet orifice 18 is designed relative to the intake capillary 12, so that the pressure applied externally to the orifice, or, in other words, the pressure in pipe 14, is always less than 0.53 of the chamber pressure, in order that "maximum flow" conditions may exist in the orifice. Then any variations in the pressure applied externally to the outlet orifice has no influence on the chamber pressure. Thus, in the case given above, the pressure of 2 pounds per square inch in the outlet pipe 14 is less than 0.53, or less than substantially one-half, of the pressure in the chamber which ranges from 5 to 5.20 pounds per square inch absolute. This is a very desirable result in that the operating pressure produced by the exhauster 15 may vary so long as it is maintained less than substantially one-half the chamber pressure and hence such operating pressure in the pipe 14 does not require close regulation. Thus, the known principle of "maximum flow" through an orifice (effusion outlet orifice 18) it utilized to render the pressure in chamber 13 substantially independent of fluctuations in the operating pressure or partial vacuum in pipe 14.

The flow of gaseous mixture through the capilliary 12 follows the known law of transpiration of gases while the rate of flow through the effusion orifice outlet 18, as already stated, follows the law of effusion of gas through an orifice under maximum flow conditions. The quantity of flow through the capillary, however, is equal to that through the orifice and hence the expressions for such respective rates of flow may be equated to give the following expression, with the constants for a given apparatus eliminated:—

$$p_2 = \frac{p_3}{\sqrt{KN+1}}$$

in which $p_2$ = chamber pressure.
$p_3$ = external or atmospheric pressure.
$K$ = constant.
$N$ = coefficient of viscosity of gas mixture.
This equation shows that the chamber pressure $p_2$ indicated by the recorder 20 is proportional to the barometric pressure $p_3$ and inversely proportional to the square root of a function of the viscosity of the flue gas. If the viscosity of air be taken as 100 units, then the viscosity of carbon dioxide is 81 units. For a mixture of air and $CO_2$, such as flue gas, the viscosity N bears a direct relation to the proportionate amount of the $CO_2$ present. So from the last equation it is seen that as the percentage of $CO_2$ increases, the quantity N diminishes with the consequence that pressure $p_2$ in the chamber increases and the increase is indicated by the recorder. Since the pressure $p_2$ to which the capsular diaphragm of the recorder is internally subjected is proportionate to the barometric pressure $p_3$, a change in the barometer affects both the inside and outside pressures on the pressure responsive container or diaphragm of the recorder, so that these pressures have a differential effect and counterbalance each other, having no resulting effect on the action of the recorder.

Since temperature changes may affect the rate of flow of gas through the capillary and the outlet orifice, it is preferred to insulate the latter from such changes by enclosing the same in a double walled container such as shown at 24 in the drawings of the "thermos" bottle variety filled with water in which the sensitive element of the apparatus is immersed.

While the invention has been disclosed in the present instance in connection with an application particularly adapted for recording the percentage of $CO_2$ in flue gas, it is obvious that the invention is capable of application, as well, to measuring the quantity of any component gas in a gaseous mixture where such component has a considerably different value for the coefficient of viscosity from that of the component which it replaces in the mixture and that the invention may be employed not only to measure, indicate and record such a variable but also for regulating a furnace or other apparatus by the substitution of a suitable regulating device for the recording mechanism.

The operation of the apparatus has been explained above in conjunction with the description of its construction and it will be understood that with the exhauster 15 in operation and with a current of flue gas supplied to the reservoir 5, a sample of such gaseous mixture is drawn through pipe 10 and capillary 11 into chamber 13 from which it escapes through the outlet orifice 18 to the exhauster 15. The pressure in chamber 13 is transmitted to the recorder 20, the dial of which is preferably marked directly in terms of percentage of $CO_2$. Pen arm 21, therefore, moves over the chart as the latter is driven by its clock to afford a continuous indication of the proportion, at any given time, of $CO_2$ in the sample of flue gas.

I claim as my invention:

1. A gas analysis apparatus comprising a chamber having a capillary inlet passage adapted to be supplied with a mixture of gases including one or more component gases the quantity of which is to be measured, a restricted outlet passage for said chamber, means for maintaining a predetermined difference in the pressures to which said passages are externally subjected, one of said passages being constructed relative to the other and to said pressures to maintain a pressure between opposite sides thereof adapted to maintain a rate of flow therethrough substantially independent of fluctuations in the external pressure thereon, and a pressure sensitive device communicating with said chamber and having a part movable in response to the pressure therein as a function of the quantity of said gas or gases to be measured in said gaseous mixture.

2. A gas analysis apparatus comprising a chamber having a capillary inlet for communication with a supply of gaseous mixture including one or more component gases the quantity of which in said mixture is to be measured, a restricted outlet passage for said chamber, means for maintaining a predetermined difference between the pressure of said supply of gaseous mixture and the pressure to which said outlet passage is externally subjected, said outlet passage being so proportioned as to maintain a pressure between opposite sides thereof adapted to maintain a maximum flow therethrough substantially independent of fluctuations in the external pressure thereon, and a pressure responsive device communicating with said chamber and having a part movable in response to the pressure therein as a function of the quantity of said gas or gases to be measured in said mixture.

3. A gas analysis apparatus comprising a chamber having a capillary inlet passage, means for supplying said inlet passage with a mixture of gases the quantity of one or more of which in said mixture is to be measured, a restricted outlet passage for said chamber, means for maintaining a predetermined difference between the pressure of said supply of gaseous mixture and the pressure to which said outlet passage is externally subjected, said outlet passage being constructed relative to said inlet passage and to said pressures to maintain a pressure in the chamber more than twice that, substantially, to which said outlet passage is externally subjected to maintain a maximum flow through the latter and render the chamber pressure substantially independent of fluctuations in the external pressure on said outlet passage, and a device connected with said chamber having a part movable in response to the pressure therein as a function of the quantity of said gas or gases to be measured in said mixture.

4. A gas analysis apparatus comprising a chamber having a capillary inlet passage adapted to be supplied with a mixture of gases including one or more component gases the quantity of which is to be measured, a restricted outlet passage for said chamber, means for maintaining a predetermined difference in the pressures to which said passages are externally subjected, one of said passages being constructed relative to the other and to said pressures to maintain a pressure between opposite sides thereof adapted to maintain a rate of flow therethrough substantially independent of fluctuations in the external pressure thereon, and a pressure responsive device subjected differentially to the pressure in said chamber and to the external pressure on said chamber inlet and movable responsively to said pressures as a function of the quantity of said component gas or gases to be measured.

5. A gas analysis apparatus comprising a chamber having a capillary inlet passage, means for supplying said passage at atmospheric pressure with a mixture of gases to be analyzed, a restricted outlet passage for said chamber subjected externally to a partial vacuum, one of said passages being constructed relative to the other and to said pressures to maintain a pressure between opposite sides thereof adapted to maintain a maximum flow therethrough substantially independent of fluctuations in said partial vacuum, and a device connected with said chamber for actuation by the pressure therein as a function of the quantity of one or more component gases present in said mixture.

6. A gas analysis apparatus comprising a chamber having a capillary inlet passage adapted to be supplied with a mixture of gases to be analyzed, a restricted outlet passage for said chamber, means for maintaining a predetermined difference in the pressures to which said passages are externally subjected, one of said passages being constructed relative to the other and to said pressures to maintain a pressure between opposite sides thereof adapted to maintain a maximum flow therethrough substantially independent of fluctuations in the external pressure thereon, and a pressure responsive container subjected externally to the pressure of said supply of gaseous mixture and internally to said chamber pressure to measure the latter as a function of the quantity of a component gas in said mixture, independently of variations in the pressure of said supply of gaseous mixture.

7. A gas analysis apparatus having a restricted inlet passage adapted to be supplied with a mixture of the gases to be analyzed, a restricted outlet passage for said chamber, one of said passages having a capillary bore for producing transpiratory flow, means for maintaining a predetermined difference in the pressures to which said passages are externally subjected, the other of said passages being constructed relative to said capillary passage and to said pressures to maintain a pressure between opposite sides of said other passage adapted to maintain a maximum flow through the same substantially independent of fluctuations in the external pressure thereon, and a device for actuation by pressure in said chamber as a function of the quantity of one or more of the component gases present in said mixture.

8. A gas analysis apparatus comprising a chamber having a capillary inlet, means for supplying said inlet with a mixture of gases to be analyzed, a restricted outlet for said chamber, means for subjecting said outlet to a pressure less than that of said supply of gaseous mixture, said outlet being so proportioned relative to said inlet and said pressures as to maintain a pressure difference between opposite sides of said outlet passage adapted to maintain a rate of flow therethrough substantially independent of fluctuations in said lesser pressure, and a pressure responsive device connected with said chamber and having a part movable responsively to the chamber pressure as a function of the quantity of said component gas or gases to be measured.

9. A gas analysis apparatus comprising a chamber having a capillary inlet, means for supplying said inlet with a mixture of gases to be analyzed, a restricted outlet passage for said chamber, means for subjecting said outlet passages externally to a partial vacuum, said outlet passage being so proportioned as to maintain the pressure in said chamber between said passages more than twice that, substantially, of said partial vacuum, and a flexible walled container communicating with and movable responsively to said chamber pressure as a function of the quantity of one or more component gases to be measured in said mixture.

10. A gas analysis apparatus comprising a chamber having a capillary inlet adapted to be supplied with a mixture of gases to be analyzed, an effusion orifice outlet for said chamber, means for maintaining a difference between the pressure of said supply of gaseous mixture and the pressure to which said outlet is externally subjected to maintain a flow of gaseous mixture therethrough, said outlet being so proportioned as to maintain the pressure in said chamber more than twice that, substantially, to which said outlet is externally subjected, to maintain a maximum flow through said outlet and render the pressure in said chamber substantially independent of fluctuations in said outlet pressure, and a pressure responsive device connected with said chamber for actuation thereby as a function of the quantity of one or more component gases in said mixture, said device being subjected also to the pressure of said supply of gaseous mixture to compensate for variations produced by the latter in said chamber pressure.

11. A gas analysis apparatus comprising a chamber having a capillary inlet passage for communication with a supply of gaseous mixture to be analyzed, a restricted outlet passage for said chamber, means for maintaining a predetermined difference in the pressures to which said passages are externally subjected, temperature controlling means for maintaining said chamber and passages at a substantially constant temperature, said outlet passage being so proportioned as to maintain a pressure difference between the opposite sides thereof operating to maintain a rate of flow through the latter substantially independent of fluctuations in the external pressure thereon, and a device for actuation by the pressure in said chamber as a function of the quantity of a component gas in said mixture.

12. A gas analysis apparatus comprising a chamber having a capillary inlet, means for supplying said inlet with a gaseous mixture to be analyzed, an effusion orifice outlet for said chamber, means for subjecting said outlet to an external pressure less than that of said supply of gaseous mixture, means for maintaining said chamber, inlet and outlet at a substantially constant temperature, said outlet being so proportioned as to maintain a pressure in said chamber more than twice that, substantially of said external outlet pressure to maintain a maximum flow through said outlet substantially independent of fluctuations in said external pressure thereon, and a pressure responsive device connected with said chamber and having a part movable responsively to the pressure in the latter as a function of the quantity of the component gas or gases to be measured in said mixture.

13. A gas analysis apparatus comprising a chamber having a capillary intake and having a restricted outlet, means for supplying a mixture of gases to be analyzed to said intake, means for subjecting said outlet externally to a pressure less than that of said supply of gaseous mixture, said outlet being so proportioned relative to said capillary intake and to the external pressures on said intake and outlet as to maintain a maximum flow through said outlet substantially independent of fluctuations in said external outlet pressure, temperature controlling means for maintaining said chamber, intake and outlet at a substantially constant temperature, and a pressure indicating means connected to said inlet chamber to indicate the pressure therein as an indication of the quantity of a component gas or gases to be measured in said mixture.

14. A gas analysis apparatus comprising a chamber having at one end a capillary intake for communication with a supply of gaseous mixture to be analyzed and having its opposite end provided with an effusion orifice outlet, insulating means enclosing said chamber, intake and outlet to maintain the same at a substantially constant temperature, means for subjecting said outlet externally to a partial vacuum, said outlet being proportioned relatively to said intake to maintain a chamber pressure more than twice that of said vacuum to maintain a maximum flow through said outlet substantially independent of fluctuations in the said vacuum, and a pressure responsive device connected with and movable responsively to the chamber pressure.

15. A gas analysis apparatus comprising a chamber having a capillary inlet passage and a restricted outlet passage, means for maintaining a negative pressure externally of the outlet passage, the said passages being so dimensioned that the rate of flow of gas through the chamber is substantially independent of fluctuations in external pressure thereon, means for passing a gas to be tested to the inlet passage, and a pressure-responsive device connected with the chamber.

KENNETH L. TATE.